(12) United States Patent
Lin et al.

(10) Patent No.: US 12,292,160 B2
(45) Date of Patent: May 6, 2025

(54) AUTOMATIC DROPPING LUBRICATING DEVICE

(71) Applicant: Huaneng Jiaxiang Power Generation Co., Ltd., Shandong (CN)

(72) Inventors: Tao Lin, Shandong (CN); Liang Chu, Shandong (CN); Qimeng Zhang, Shandong (CN)

(73) Assignee: HUANENG JIAXIANG POWER GEBERATION CO., LTD., Jining (CN)

( * ) Notice: Subject to any disclaimer, the term of this patent is extended or adjusted under 35 U.S.C. 154(b) by 20 days.

(21) Appl. No.: 18/447,323

(22) Filed: Aug. 10, 2023

(65) Prior Publication Data

US 2023/0383904 A1 Nov. 30, 2023

Related U.S. Application Data

(63) Continuation of application No. PCT/CN2022/084018, filed on Mar. 30, 2022.

(30) Foreign Application Priority Data

Sep. 10, 2021 (CN) .......................... 202111063044.5

(51) Int. Cl.
    *F16N 7/02* (2006.01)
    *F16N 39/06* (2006.01)

(52) U.S. Cl.
    CPC ............... *F16N 7/02* (2013.01); *F16N 39/06* (2013.01)

(58) Field of Classification Search
    CPC . F16N 7/02; F16N 39/06; F16N 39/00; B65D 83/0005; B65D 83/0033;
(Continued)

(56) References Cited

U.S. PATENT DOCUMENTS

| | | | | | |
|---|---|---|---|---|---|
| 2,495,671 | A | * | 1/1950 | Cellwork | ................ F16N 39/00 222/182 |
| 5,829,875 | A | * | 11/1998 | Hagel | ................ B65D 83/0005 222/386 |
| 2013/0277149 | A1 | * | 10/2013 | Conley | ................ F16N 39/002 184/6.21 |

FOREIGN PATENT DOCUMENTS

| | | |
|---|---|---|
| CN | 202674782 U | 1/2013 |
| CN | 104385477 A | 3/2015 |

(Continued)

*Primary Examiner* — Henry Y Liu
*Assistant Examiner* — Mark K Buse
(74) *Attorney, Agent, or Firm* — Ming Jiang; OPENPTO US LLC

(57) ABSTRACT

An automatic dropping lubricating device comprises a tank body, a stirring mechanism, a filter mechanism and an intermittent mechanism, a drive motor is fixedly connected to the middle of the right side wall of the tank body, the stirring mechanism is rotationally connected to the middle of an inner cavity of the tank body, the filter mechanism is fixedly connected to the middle of a charging pipe, and the intermittent mechanism is arranged on the right side of the bottom of the tank body. The invention drives a telescopic rod to rotate so that the telescopic rod props against a trigger slider for sliding and the trigger slider drives a movable plate to slide; when the movable plate slides, a connecting pipe slides in a second chute, and finally the connecting pipe is connected to a dropping port while a dropping pipe is connected to the connecting pipe.

7 Claims, 6 Drawing Sheets

(58) Field of Classification Search
CPC .. A47K 5/1217; A47K 5/217; B05C 17/0103; Y02P 70/10
USPC ................................................ 222/386, 390
See application file for complete search history.

(56) References Cited

FOREIGN PATENT DOCUMENTS

| | | | |
|---|---|---|---|
| CN | 205298089 | U | 6/2016 |
| CN | 106594087 | A | 4/2017 |
| CN | 208907543 | U | 5/2019 |
| CN | 209577200 | U | 11/2019 |
| CN | 211040433 | U | 7/2020 |
| CN | 212338875 | U | 1/2021 |
| CN | 212565249 | U | 2/2021 |
| CN | 214064547 | U | 8/2021 |
| CN | 113847539 | A | 12/2021 |
| DE | 202018101471 | U1 | 6/2018 |
| GB | 938076 | A | 9/1963 |
| KR | 101480081 | B1 | 1/2015 |

* cited by examiner

AUTOMATIC DROPPING LUBRICATING DEVICE

CROSS-REFERENCE TO RELATED APPLICATIONS

This application is a continuation of PCT/CN2022/084018, filed Mar. 30, 2022 and claims priority of Chinese Patent Application No. 202111063044.5, filed on Sep. 10, 2021, the entire contents of which are incorporated herein by reference.

TECHNICAL FIELD

The invention relates to the technical field of lubrication devices, in particular to an automatic dropping lubricating device.

BACKGROUND ART

Lubricant is a lubricating medium for reducing the friction resistance of the friction pair and slowing down its abrasion, and has the functions of cooling, cleaning and pollution prevention on the friction pair. In order to improve the lubrication performance, appropriate additives can be added in some lubricants. For the selection of lubricants, the movement, material, surface roughness, operating environment and operating conditions of the friction pair as well as lubricant performance and other factors must be generally considered; in the mechanical equipment, the lubricant is mostly distributed to the parts to be lubricated through the lubricating device to lubricate the moving parts of the equipment;

At present, the existing lubricating devices require manual operation during filling, with high labor intensity, low production efficiency and time-consuming labor. Moreover, the lubricating fluid is directly added to the lubricating device without filtering, which may result in damage to the lubricating device caused by impurities contained in the lubricating fluid. The traditional lubricating device is not provided with the corresponding stirring mechanism. After the lubricating fluid enters the lubricating device, layering and condensation may occur if the lubricating fluid is not used up within the corresponding time, which will affect the use effect of the lubricating fluid.

CONTENT OF INVENTION

The invention proposes an automatic dropping lubricating device, aiming to solve the following problems in the prior art: manual filling is required, having high labor intensity and being time-consuming; the impurities contained in the lubricant cannot be filtered, which may cause damage to the lubricating device; layering and condensation may occur in the lubricating fluid that has not been used up to affect the use effect of the lubricating fluid.

In order to realize the above purpose, the invention adopts the following technical proposal:

An automatic dropping lubricating device, comprising:

A tank body, a partition plate is hermetically connected to the right side of an inner cavity of the tank body, the inner cavity of the tank body is divided into a lubricating fluid chamber and a sealing chamber by the partition plate, a charging pipe is connected to the upper part of the left side wall of the tank body, and a drive motor is fixedly connected to the middle of the right side wall of the tank body;

A stirring mechanism, which is rotationally connected to the middle of the inner cavity of the tank body and is fixedly connected with an output shaft of the drive motor; the stirring mechanism is used to stir the lubricating fluid in the lubricating fluid chamber to avoid condensation;

A filter mechanism, which is fixedly connected to the middle of the charging pipe, and the upper and lower ends of the filter mechanism (6) are internally connected with the charging pipe; An intermittent mechanism, which is arranged on the right side of the bottom of the tank body, is used for intermittently and automatically dropping lubricating fluid and comprises a curved box, a spring, a movable plate, a pulley and a trigger slider, the curved box is fixedly connected to the right side of the bottom of the tank body, the spring is fixedly connected to two sides of the inside wall of the curved box, the movable plate is fixedly connected to the other end of the spring, the upper surface of the movable plate is hermetically connected with the lower side wall of the tank body in a sliding way, the pulley is fixedly connected to the bottom of the movable plate on both sides, the bottom of the pulley is connected with the bottom of the inner cavity of the curved box in a sliding way, a chute is arranged on the side wall of the tank body at the bottom of the sealing chamber, the trigger slider is fixedly connected to the right end of the movable plate and is connected to the inner cavity of the chute in a sliding way, and a telescopic rod is fixedly connected to the side wall of a rotating shaft located in the sealing chamber and can prop against the trigger slider for sliding.

Preferably, the stirring mechanism comprises a rotating shaft, a blade and a corrugated groove, the rotating shaft is rotationally connected with the side wall of the inner cavity of the tank body, the right end of the rotating shaft is fixedly connected with an output shaft of the drive motor, the blade is fixedly connected to the side wall of the rotating shaft located in the lubricating fluid chamber, and the corrugated groove is arranged on the side wall of the blade.

Preferably, a scraping plate is fixedly connected on the outer edge of the blade, and the scraping plate is fitted with the side wall of the inner cavity of the lubricating fluid chamber.

Preferably, the filter mechanism comprises a box body, an inclined filter screen, a collecting pipe for lubricant filtrate residues and a filter screen, the box body is fixedly connected to the middle of the charging pipe, the inclined filter screen is fixedly connected to the upper part on the inner side of the box body, the collecting pipe for lubricant filtrate residues is connected between the upper part and the lower part of the side wall of the box body, and the filter screen is fixedly connected to the output end of the collecting pipe for lubricant filtrate residues.

Preferably, a sealing flange is fixedly connected to the upper and lower ends of the sewage collecting pipe and is fixed connected with the side wall of the box body.

Preferably, a first chute is arranged at the left end of the movable plate, a dropping pipe is fixedly connected at the bottom of the lubricating fluid chamber above the first chute and is hermetically connected with the first chute in a sliding way, a connecting pipe is fixedly connected at the rear end of the first chute, a second chute is arranged on the bottom side wall of the inner cavity of the curved box under the connecting pipe, the connecting pipe is hermetically connected with the second chute in a sliding way, and a dropping port is fixedly connected at the front end of the second chute.

Preferably, the contact surfaces between the telescopic rod and the trigger slider are arc-shaped, and the two arc contact surfaces are symmetrical in the arc direction.

Compared with the prior art, the invention has the following beneficial effects:

1. During filling, the lubricating fluid is firstly filtered by the inclined filter screen, the filtered residues and part of the lubricating fluid enters the collecting pipe for lubricant filtrate residues, then the lubricating fluid entering accidently can be discharged by the filter screen arranged at the output end of the collecting pipe for lubricant filtrate residues, and the filtrate residues are blocked and collected, thus not only improving the quality of the filled lubricating fluid, but also facilitating the collection of filtrate residues; by arranging the sealing flange at the upper and lower ends of the collecting pipe for lubricant filtrate residues, the collecting pipe for lubricant filtrate residues can be easily disassembled and installed, the residues inside the collecting pipe for lubricant filtrate residues can be easily poured, and the collecting pipe for lubricant filtrate residues can be washed to ensure the filtrating effect of the device.

2. In the invention, the rotating shaft is driven to rotate through the drive motor, so that the blade stirs the lubricating fluid in the lubricating fluid chamber to avoid condensing, resulting in subsequent failure to drop normally; moreover, the corrugated groove is arranged on the side wall of the blade, which can accelerate the flow of lubricating fluid, thus improving the mixing effect of the blade during stirring; in addition, when the blade rotates, the scraping plate also scrapes the side wall of the inner cavity of the lubricating fluid chamber, which can avoid difficult cleaning due to the long-term adhesion of the lubricating fluid to the inner wall of the lubricating fluid, and can also cause the attached lubricating fluid to fall into the stirred lubricating fluid to reduce the ineffective loss of the lubricating fluid, so that the device can make more full use of resources.

3. The telescopic rod is driven to rotate while the rotating shaft rotates; when the telescopic rod rotates to the bottom of the sealing chamber along with the rotating shaft, the telescopic rod props against the trigger slider for sliding, and the trigger slider drives the movable plate to slide at the same time; the pulley is arranged at the bottom of the movable plate, thereby reducing the sliding difficulty of the movable plate and ensuring that the telescopic rod can smoothly drive the movable plate to slide; when the movable plate slides to the other side, the connecting pipe slides in the second chute along with the movable plate, and finally the lower part of the connecting pipe is connected to the upper part of the dropping port; meanwhile, the lower part of the dropping pipe is connected with the upper part of the connecting pipe by the sliding effect between the first chute and the dropping pipe during the sliding process of the movable plate, so that the lubricating fluid chamber is connected to the outside to complete an automatic dropping process, greatly reducing the need for labor and improving the economic benefits of the enterprise.

4. When the telescopic rod pushes the trigger slider to the other end of the chute and can no longer push, the telescopic end of the telescopic rod is lifted through the oblique friction of the arc as the contact surfaces between the telescopic rod and the trigger slider are arc-shaped, so that the telescopic rod retracts, and finally the telescopic rod falls off to push the trigger slider; meanwhile, the movable plate moves to the initial direction under the rebound action of the spring to block the connection among the dropping pipe, the connecting pipe and the dropping port, so that the dropping operation of the device is interrupted, and the dropping operation can be repeated only after the telescopic rod rotates by a turn again; in this way, the dropping interval of the device can be controlled by controlling the rotation speed of the telescopic rod driven by the drive motor, so that the device can be used for mechanical equipment with different requirements, improving the scope of application of the device.

EMBODIMENTS

The technical proposal in the embodiments of the invention is clearly and completely described in combination with the drawings to the embodiments of the invention. Obviously, the described embodiments are only part of the embodiments of the invention, but not all embodiments.

Figure 1:
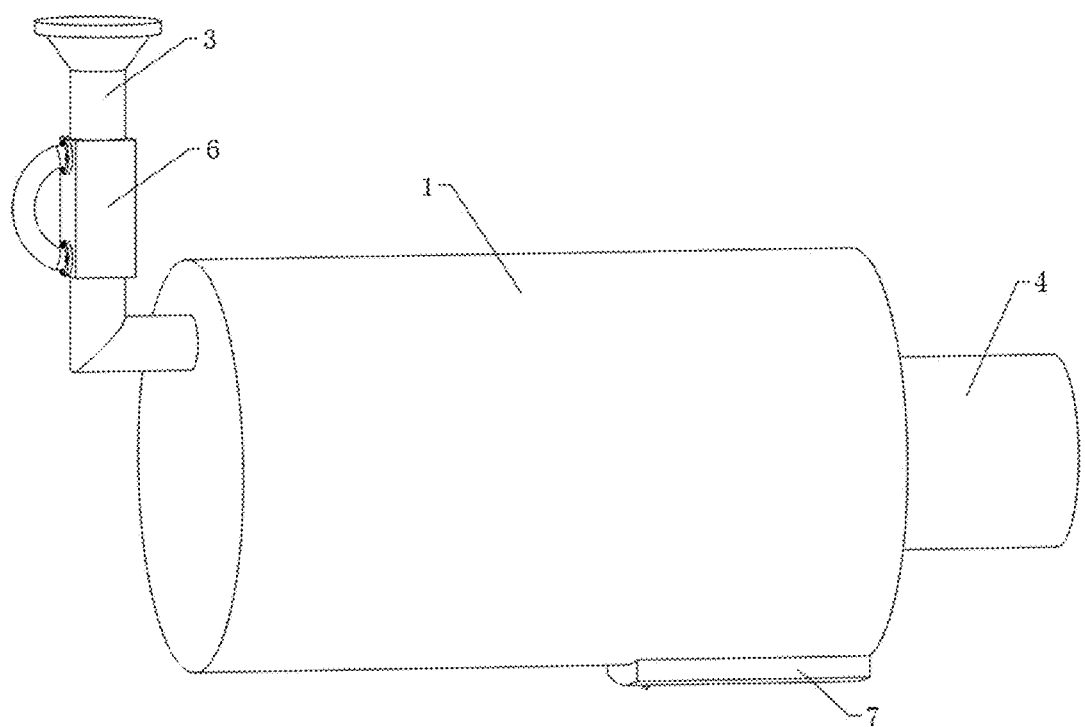
FIG. 1 is the front view for the overall structure of an automatic dropping lubricating device proposed by the invention.
Figure 2:
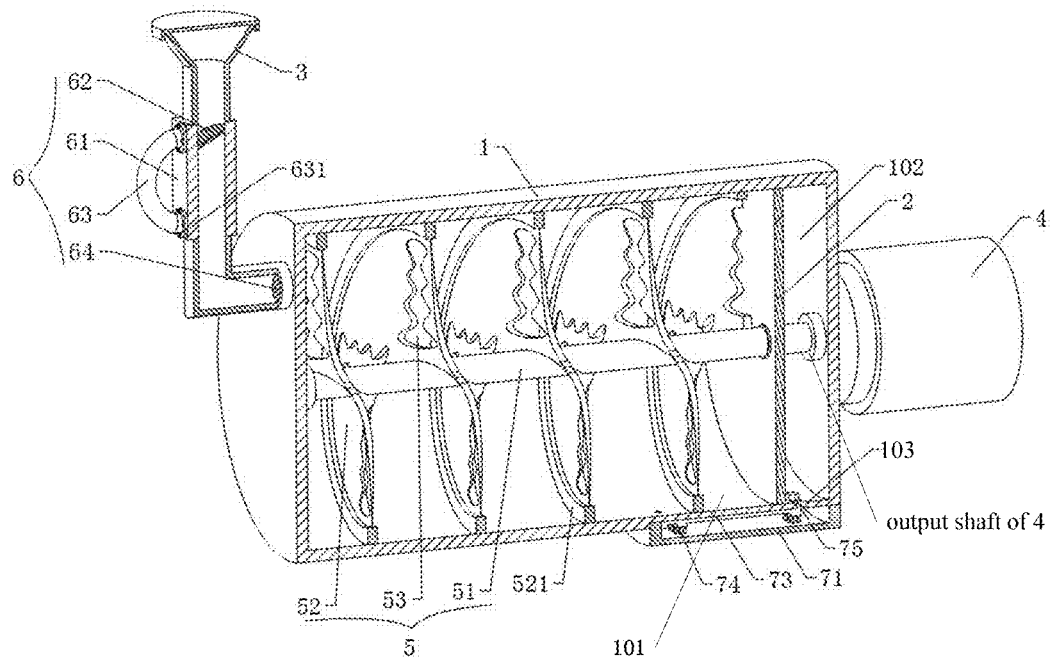
FIG. 2 is the left semi-sectional view of an automatic dropping lubricating device proposed by the invention.
Figure 3:
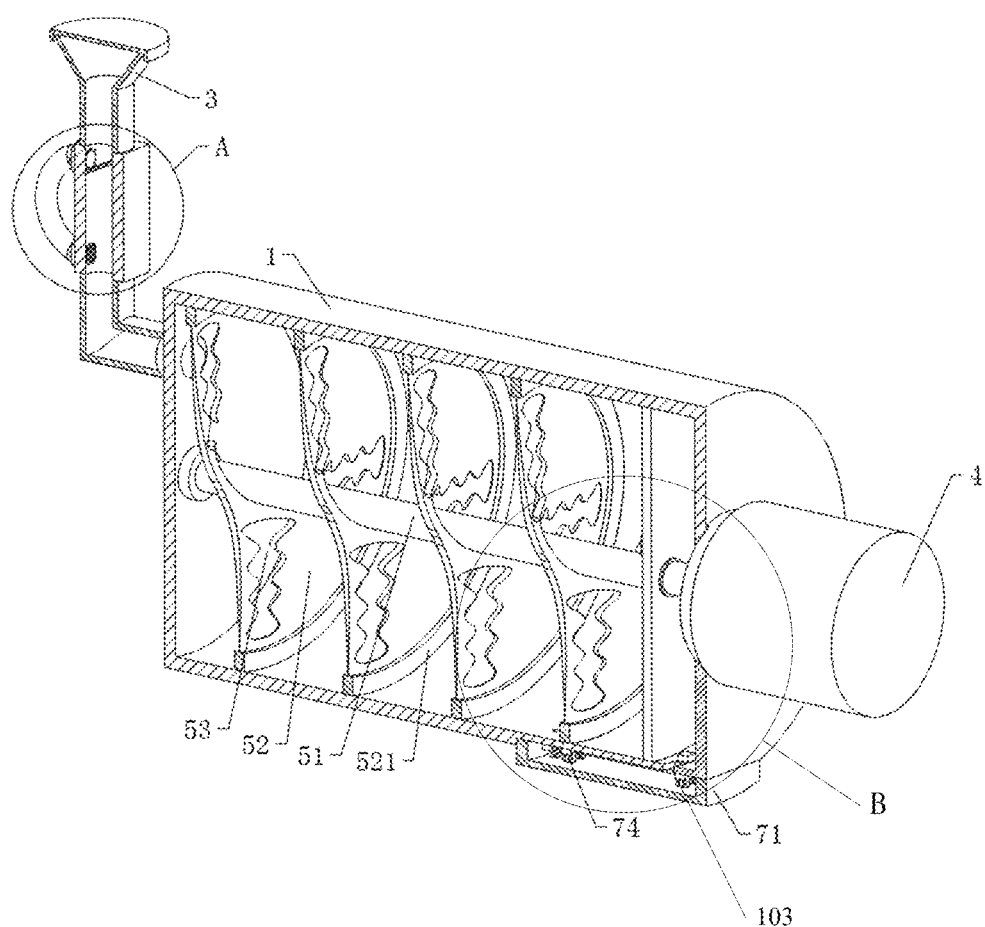
FIG. 3 is the right semi-sectional view of an automatic dropping lubricating device proposed by the invention.

As shown in FIG. 1, FIG. 2 and FIG. 3, an automatic dropping lubricating device comprises:

A tank body 1, a partition plate is hermetically connected to the right side of an inner cavity of the tank body 1, the inner cavity of the tank body 1 is divided into a lubricating fluid chamber 101 and a sealing chamber 102 by the partition plate 2, a charging pipe 3 is connected to the upper part of the left side wall of the tank body 1, and a drive motor 4 is fixedly connected to the middle of the right side wall of the tank body 1;

A stirring mechanism 5, which is rotationally connected to the middle of the inner cavity of the tank body 1 and is fixedly connected with an output shaft of the drive motor 4; the stirring mechanism 5 is used to stir the lubricating fluid in the lubricating fluid chamber 101 to avoid condensation;

A filter mechanism 6, which is fixedly connected to the middle of the charging pipe 3, and the upper and lower ends of the filter mechanism 6 are internally connected with the charging pipe 3;

An intermittent mechanism 7, which is arranged on the right side of the bottom of the tank body 1, is used for intermittently and automatically dropping lubricating fluid and comprises a curved box 71, a spring 72, a movable plate 73, a pulley 74 and a trigger slider 75, the curved box 71 is fixedly connected to the right side of the bottom of the tank body 1, the spring 72 is fixedly connected to two sides of the inside wall of the curved box 71, the movable plate 73 is fixedly connected to the other end of the spring 72, the upper surface of the movable plate 73 is hermetically connected with the lower side wall of the tank body 1 in a sliding way, the pulley 74 is fixedly connected to the bottom of the movable plate 73 on both sides, the bottom of the pulley 74 is connected with the bottom of the inner cavity of the curved box 71 in a sliding way, a chute 103 is arranged on the side wall of the tank body 1 at the bottom of the sealing chamber 102, the trigger slider 75 is fixedly connected to the right end of the movable plate 73 and is connected to the inner cavity of the chute 103 in a sliding way, and a telescopic rod 8 is fixedly connected to the side wall of a rotating shaft 51 located in the sealing chamber 102 and can prop against the trigger slider 75 for sliding.

The above structure can prevent the condensation of the lubricant and intermittently and automatically drop the lubricant, which greatly saves the consumption of manpower and improves the economic benefits of the enterprise.

As shown in FIG. 2 and FIG. 3, the stirring mechanism 5 comprises a rotating shaft 51, a blade 52 and a corrugated groove 53, the rotating shaft 51 is rotationally connected with the side wall of the inner cavity of the tank body 1, the right end of the rotating shaft 51 is fixedly connected with an output shaft of the drive motor 4, the blade 52 is fixedly connected to the side wall of the rotating shaft 51 located in the lubricating fluid chamber 101, and the corrugated groove 53 is arranged on the side wall of the blade 52;

By arranging the above structure, when the drive motor 4 drives the rotating shaft 51 to rotate, the blade 52 stirs the lubricating fluid in the lubricating fluid chamber 101 to avoid condensation, resulting in the subsequent failure to drop normally, and the corrugated groove 53 is arranged on the side wall of the blade 52, which can accelerate the flow of lubricating fluid, thereby improving the mixing effect of the blade 52 during stirring.

As shown in FIG. 3, a scraping plate 521 is fixedly connected on the outer edge of the blade 52, and the scraping plate 521 is fitted with the side wall of the inner cavity of the lubricating fluid chamber 101;

By arranging the above structure, while the blade 52 rotates, the scraping plate 521 also scrapes the side wall of the inner cavity of the lubricating fluid chamber 101, which can avoid difficult cleaning due to the long-term adhesion of the lubricating fluid to the inner wall of the lubricating fluid, and can also cause the attached lubricating fluid to fall into the stirred lubricating fluid to reduce the ineffective loss of the lubricating fluid, so that the device can make more full use of resources.

Figure 4:
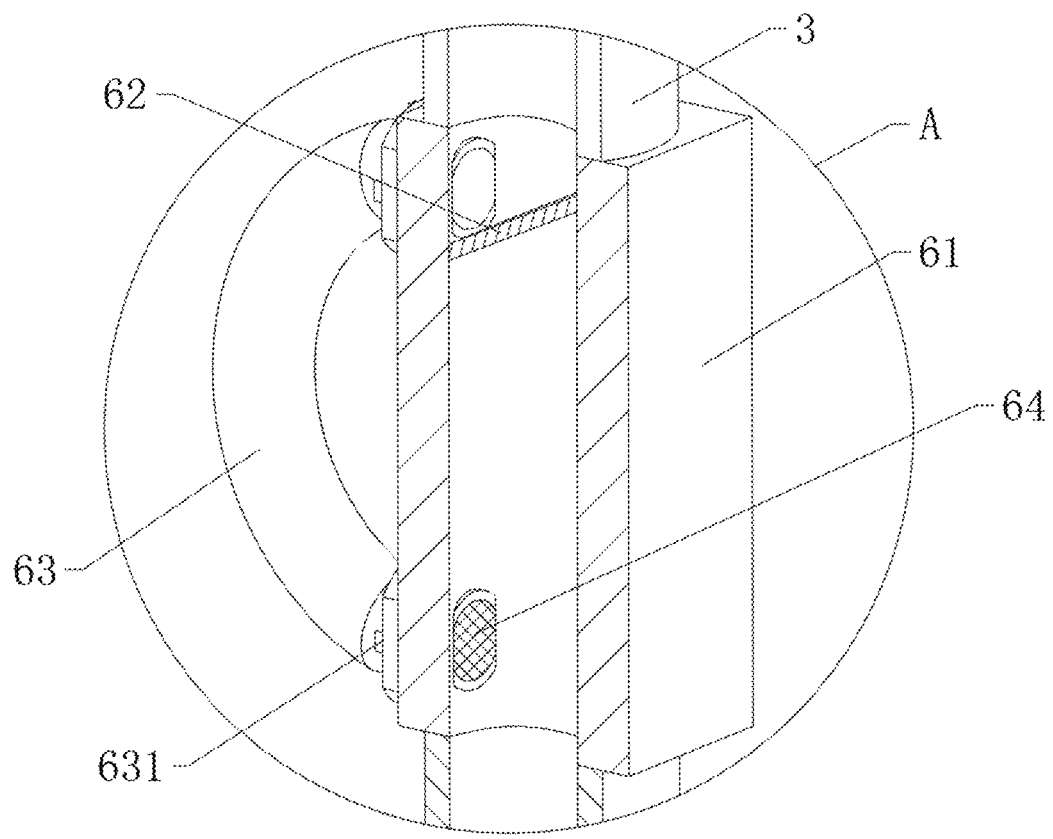
FIG. 4 is the amplified structure diagram for the area A in FIG. 3 of an automatic dropping lubricating device proposed by the invention.

As shown in FIG. 2, FIG. 3 and FIG. 4, the filter mechanism 6 comprises a box body 61, an inclined filter screen 62, a collecting pipe for lubricant filtrate residues 63 and a filter screen 64, the box body 61 is fixedly connected to the middle of the charging pipe 3, the inclined filter screen 62 is fixedly connected to the upper part on the inner side of the box body 61, the collecting pipe for lubricant filtrate residues 63 is connected between the upper part and the lower part of the side wall of the box body 61, and the filter screen 64 is fixedly connected to the output end of the collecting pipe for lubricant filtrate residues 63;

By arranging the above structure, when lubricating fluid is added to the lubricating fluid chamber 101 through the charging pipe 3, the lubricating fluid is firstly filtered by the inclined filter screen 62, the filtered residues and part of the lubricating fluid enters the collecting pipe for lubricant filtrate residues 63, then the lubricating fluid entering accidently can be discharged by the filter screen 64 arranged at the output end of the collecting pipe for lubricant filtrate residues 63, and the filtrate residues are blocked and collected, thus not only improving the quality of the filled lubricating fluid, but also facilitating the collection of filtrate residues.

As shown in FIG. 2, a sealing flange 631 is fixedly connected to the upper and lower ends of the collecting pipe for lubricant filtrate residues 63 and is fixed connected with the side wall of the box body 61; By arranging the above structure, the collecting pipe for lubricant filtrate residues 63 can be easily disassembled and installed, the residues inside the collecting pipe for lubricant filtrate residues 63 can be easily poured, and the collecting pipe for lubricant filtrate residues 63 can be washed to ensure the filtrating effect of the device.

Figure 5:
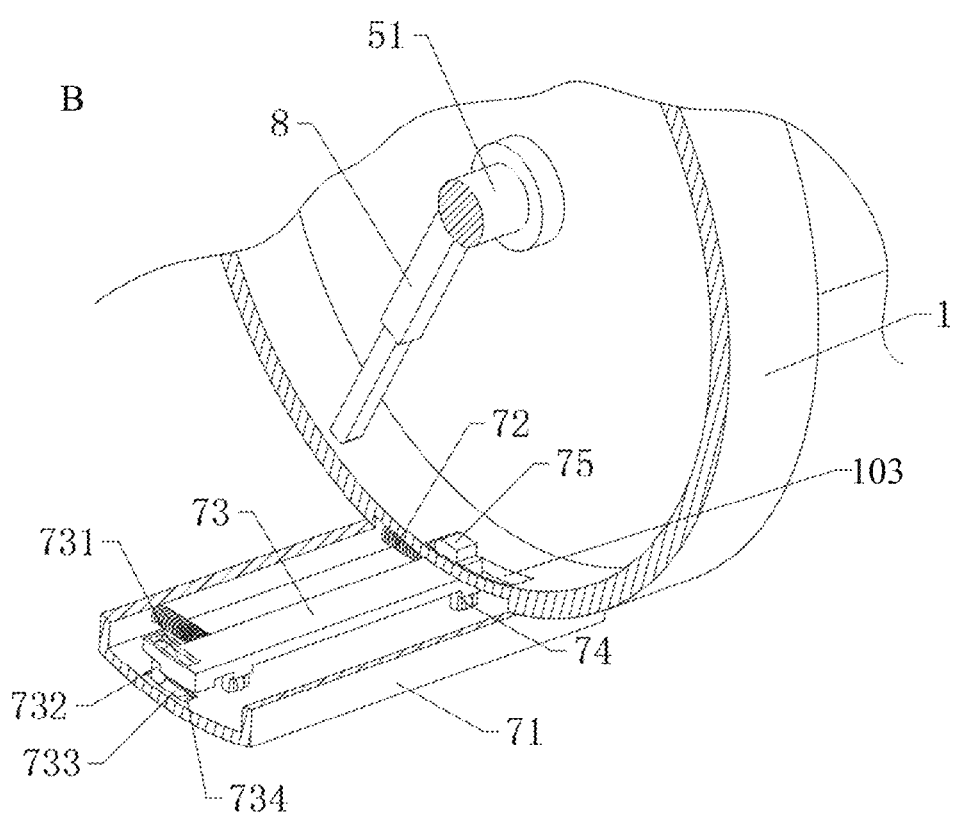
FIG. 5 is the internal structure diagram for the curved box of an automatic dropping lubricating device proposed by the invention.
Figure 6:
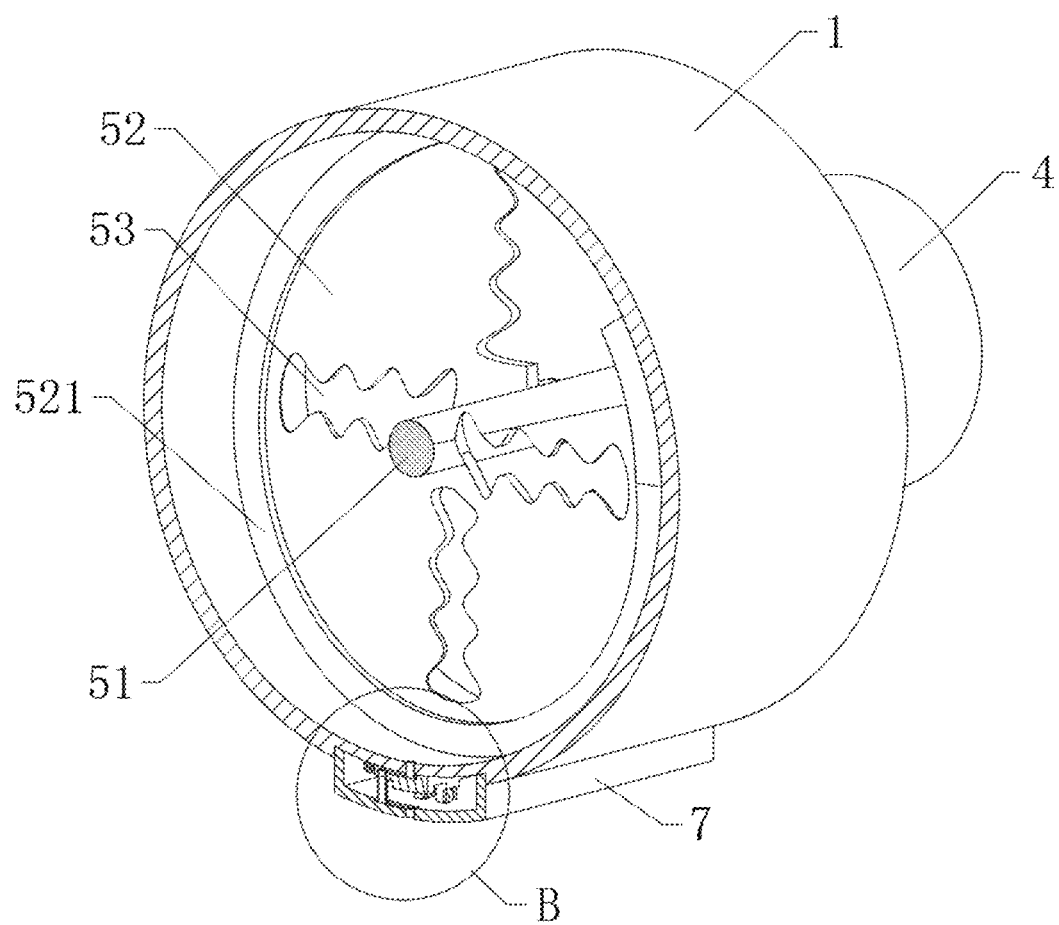
FIG. 6 is the semi-sectional structure diagram for the curved box of an automatic dropping lubricating device proposed by the invention.
Figure 7:
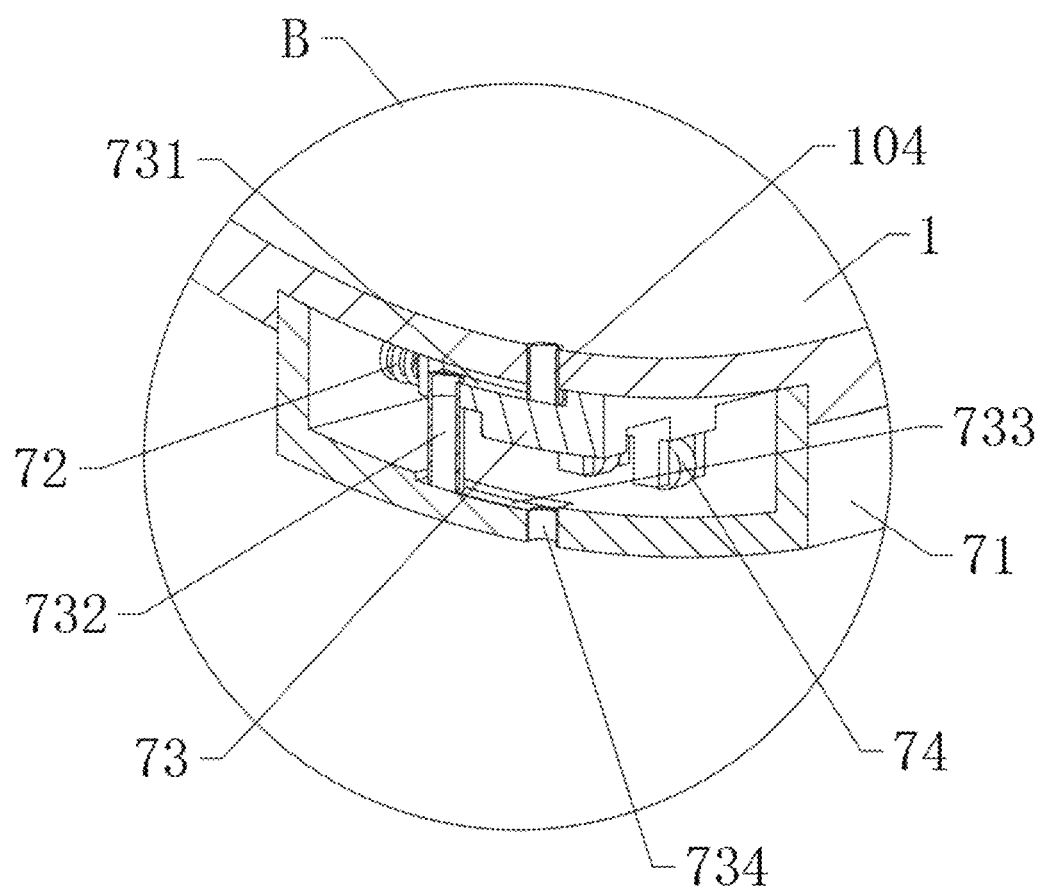
FIG. 7 is the amplified structure diagram for the area B in FIG. 6 of an automatic dropping lubricating device proposed by the invention.

As shown in FIG. 5, FIG. 6 and FIG. 7, a first chute 731 is arranged at the left end of the movable plate 73, a dropping pipe 104 is fixedly connected at the bottom of the lubricating fluid chamber 101 above the first chute 731 and is hermetically connected with the first chute 731 in a sliding way, a connecting pipe 732 is fixedly connected at the rear end of the first chute 731, a second chute 733 is arranged on the bottom side wall of the inner cavity of the curved box 71 under the connecting pipe 732, the connecting pipe 732 is hermetically connected with the second chute 733 in a sliding way, and a dropping port 734 is fixedly connected at the front end of the second chute 733;

By arranging the above structure, the telescopic rod 8 is driven to rotate while the rotating shaft 51 rotates; when the telescopic rod 8 rotates to the bottom of the sealing chamber 102 along with the rotating shaft 51, the telescopic rod 8 props against the trigger slider 75 for sliding, the trigger slider 75 firstly slides to the other side of the chute 103, and the trigger slider 75 drives the movable plate 73 to slide at the same time; the pulley 74 is arranged at the bottom of the movable plate 73, thereby reducing the sliding difficulty of the movable plate 73 and ensuring that the telescopic rod 8 can smoothly drive the movable plate 73 to slide; when the movable plate 73 slides to the other side, the connecting pipe 732 slides in the second chute 733 along with the movable plate 73, and finally the lower part of the connecting pipe 732 is connected to the upper part of the dropping port 734; meanwhile, the lower part of the dropping pipe 104 is connected with the upper part of the connecting pipe 732 by the sliding effect between the first chute 731 and the dropping pipe 104 during the sliding process of the movable plate 73, so that the lubricating fluid chamber 101 is connected to the outside to complete an automatic dropping process, greatly reducing the need for labor and improving the economic benefits of the enterprise.

As shown in FIG. 5, the contact surfaces between the telescopic rod 8 and the trigger slider 75 are arc-shaped, and the two arc contact surfaces are symmetrical in the arc direction;

By arranging the above structure, when the telescopic rod 8 pushes the trigger slider 75 to the other end of the chute 103 and can no longer push, the telescopic end of the telescopic rod 8 is lifted through the oblique friction of the arc as the contact surfaces between the telescopic rod 8 and the trigger slider 75 are arc-shaped, so that the telescopic rod 8 retracts, and finally the telescopic rod 8 falls off to push the trigger slider 75; meanwhile, the movable plate 73 moves to the initial direction under the rebound action of the spring 72 to block the connection among the dropping pipe 104, the connecting pipe 732 and the dropping port 734, so that the dropping operation of the device is interrupted, and the dropping operation can be repeated only after the telescopic rod 8 rotates by a turn again; in this way, the dropping interval of the device can be controlled by controlling the rotation speed of the telescopic rod 8 driven by the drive motor 4, so that the device can be used for mechanical equipment with different requirements, improving the scope of application of the device.

As shown in FIG. 1 to FIG. 7, when lubricating fluid is added to the lubricating fluid chamber 101 through the charging pipe 3, the lubricating fluid is firstly filtered by the inclined filter screen 62, the filtered residues and part of the lubricating fluid enters the collecting pipe for lubricant filtrate residues 63, then the lubricating fluid entering accidently can be discharged by the filter screen 64 arranged at the output end of the collecting pipe for lubricant filtrate residues 63, and the filtrate residues are blocked and collected, thus not only improving the quality of the filled lubricating fluid, but also facilitating the collection of filtrate residues; by arranging the sealing flange 631 at the upper and lower ends of the collecting pipe for lubricant filtrate residues 63, the collecting pipe for lubricant filtrate residues 63 can be easily disassembled and installed, the residues inside the collecting pipe for lubricant filtrate residues 63 can be easily poured, and the collecting pipe for lubricant filtrate residues 63 can be washed to ensure the filtrating effect of the device;

When the drive motor 4 drives the rotating shaft 51 to rotate, the blade 52 stirs the lubricating fluid in the lubricating fluid chamber 101 to avoid condensation, resulting in the subsequent failure to drop normally, and the corrugated groove 53 is arranged on the side wall of the blade 52, which can accelerate the flow of lubricating fluid, thereby improving the mixing effect of the blade 52 during stirring; the telescopic rod 8 is driven to rotate while the rotating shaft 51 rotates; when the telescopic rod 8 rotates to the bottom of the sealing chamber 102 along with the rotating shaft 51, the telescopic rod 8 props against the trigger slider 75 for sliding, the trigger slider 75 firstly slides to the other side of the chute 103, and the trigger slider 75 drives the movable plate 73 to slide at the same time; the pulley 74 is arranged at the bottom of the movable plate 73, thereby reducing the sliding difficulty of the movable plate 73 and ensuring that the telescopic rod 8 can smoothly drive the movable plate 73 to slide; when the movable plate 73 slides to the other side, the connecting pipe 732 slides in the second chute 733 along with the movable plate 73, and finally the lower part of the connecting pipe 732 is connected to the upper part of the dropping port 734; meanwhile, the lower part of the dropping pipe 104 is connected with the upper part of the connecting pipe 732 by the sliding effect between the first chute 731 and the dropping pipe 104 during the sliding process of the movable plate 73, so that the lubricating fluid chamber 101 is connected to the outside to complete an automatic dropping process, greatly reducing the need for labor and improving the economic benefits of the enterprise;

When the telescopic rod 8 pushes the trigger slider 75 to the other end of the chute 103 and can no longer push, the telescopic end of the telescopic rod 8 is lifted through the oblique friction of the arc as the contact surfaces between the telescopic rod 8 and the trigger slider are arc-shaped, so that the telescopic rod 8 retracts, and finally the telescopic rod 8 falls off to push the trigger slider 75; meanwhile, the movable plate 73 moves to the initial direction under the rebound action of the spring 72 to block the connection among the dropping pipe 104, the connecting pipe 732 and the dropping port 734, so that the dropping operation of the device is interrupted, and the dropping operation can be repeated only after the telescopic rod 8 rotates by a turn again; in this way, the dropping interval of the device can be controlled by controlling the rotation speed of the telescopic rod 8 driven by the drive motor 4, so that the device can be used for mechanical equipment with different requirements, improving the scope of application of the device.

The above embodiments are only the preferred embodiments of the invention, but the scope of protection of the invention is not limited to this. Equivalent substitutions or changes made by any technical personnel familiar with the technical field within the technical scope disclosed by the invention according to the technical proposal of the invention and their inventive concepts should be covered by the scope of protection of the invention.

The invention claimed is:

1. An automatic dropping lubricating device, characterized by comprising:
a tank body (1), a partition plate is hermetically connected to a first side of an inner cavity of the tank body (1), the inner cavity of the tank body (1) is divided into a lubricating fluid chamber (101) and a sealing chamber (102) by the partition plate (2), a charging pipe (3) is connected to the upper part of a side wall of a second side of the tank body (1), and a drive motor (4) is fixedly connected to the middle of a side wall of the first side of the tank body (1);
a stirring mechanism (5), which is rotationally connected to the middle of the inner cavity of the tank body (1) and is fixedly connected with an output shaft of the drive motor (4); the stirring mechanism (5) is used to stir the lubricating fluid in the lubricating fluid chamber (101) to avoid condensation;
a filter mechanism (6), which is fixedly connected to the middle of the charging pipe (3), and the upper and lower ends of the filter mechanism (6) are internally connected with the charging pipe (3);
an intermittent mechanism (7), which is arranged on a first side of the bottom of the tank body (1), is used for intermittently and automatically dropping lubricating fluid and comprises a curved box (71), a spring (72), a movable plate (73), a pulley (74) and a trigger slider (75), the curved box (71) is fixedly connected to the first side of the bottom of the tank body (1), the spring (72) is fixedly connected to one side of the inside wall of the curved box (71), the movable plate (73) is fixedly connected to the other end of the spring (72), the upper surface of the movable plate (73) is hermetically connected with the lower side wall of the tank body (1) in a sliding way, the pulley (74) is fixedly connected to the bottom of the movable plate (73) on both sides, the bottom of the pulley (74) is connected with the bottom of the inner cavity of the curved box (71) in a sliding way, a chute (103) is arranged on the side wall of the tank body (1) at the bottom of the sealing chamber (102), the trigger slider (75) is fixedly connected to a first end of the movable plate (73) and is slidable in the inner cavity of the chute (103), and a telescopic rod (8) is fixedly connected to the side wall of a rotating shaft (51) located in the sealing chamber (102) and can prop against the trigger slider (75) for sliding.

2. The automatic dropping lubricating device according to claim 1, characterized in that the stirring mechanism (5) comprises a rotating shaft (51), a blade (52) and a corrugated groove (53), the rotating shaft (51) is rotationally connected with the side wall of the inner cavity of the tank body (1), a first end of the rotating shaft (51) is fixedly connected with an output shaft of the drive motor (4), the blade (52) is fixedly connected to the side wall of the rotating shaft (51) located in the lubricating fluid chamber (101), and the corrugated groove (53) is arranged on the side wall of the blade (52).

3. The automatic dropping lubricating device according to claim 2, characterized in that a scraping plate (521) is fixedly connected on the outer edge of the blade (52), and the scraping plate (521) is fitted with the side wall of the inner cavity of the lubricating fluid chamber (101).

4. The automatic dropping lubricating device according to claim 1, characterized in that the filter mechanism (6) comprises a box body (61), an inclined filter screen (62), a collecting pipe for lubricant filtrate residues (63) and a filter screen (64), the box body (61) is fixedly connected to the middle of the charging pipe (3), the inclined filter screen (62) is fixedly connected to the upper part on the inner side of the box body (61), the collecting pipe for lubricant filtrate residues (63) is connected between the upper part and the lower part of the side wall of the box body (61), and the filter screen (64) is fixedly connected to the output end of the collecting pipe for lubricant filtrate residues (63).

5. The automatic dropping lubricating device according to claim 4, characterized in that a sealing flange (631) is fixedly connected to the upper and lower ends of the collecting pipe for lubricant filtrate residues (63) and is fixed connected with the side wall of the box body (61).

6. The automatic dropping lubricating device according to claim 1, characterized in that a first chute (731) is arranged at a second end of the movable plate (73), a dropping pipe (104) is fixedly connected at the bottom of the lubricating fluid chamber (101) above the first chute (731) and is hermetically connected with the first chute (731) in a sliding way, a connecting pipe (732) is fixedly connected at the rear end of the first chute (731), a second chute (733) is arranged on the bottom side wall of the inner cavity of the curved box (71) under the connecting pipe (732), the connecting pipe (732) is hermetically connected with the second chute (733) in a sliding way, and a dropping port (734) is fixedly connected at the front end of the second chute (733).

7. The automatic dropping lubricating device according to claim 6, characterized in that the contact surfaces between the telescopic rod (8) and the trigger slider (75) are arc-shaped, and the two arc contact surfaces are symmetrical in the arc direction.

\* \* \* \* \*